(12) United States Patent
Dingman et al.

(10) Patent No.: US 12,426,543 B2
(45) Date of Patent: Sep. 30, 2025

(54) LAWN MOWERS, DETACHABLE MOWER DECKS, AND METHODS ASSOCIATED THEREWITH

(71) Applicant: TECHTRONIC CORDLESS GP, Anderson, SC (US)

(72) Inventors: Trent J. Dingman, Greenville, SC (US); Michael Feng, Seneca, SC (US)

(73) Assignee: TECHTRONIC CORDLESS GP, Anderson, SC (US)

( * ) Notice: Subject to any disclaimer, the term of this patent is extended or adjusted under 35 U.S.C. 154(b) by 822 days.

(21) Appl. No.: 17/175,026

(22) Filed: Feb. 12, 2021

(65) Prior Publication Data

US 2022/0142051 A1 May 12, 2022

Related U.S. Application Data

(60) Provisional application No. 63/112,465, filed on Nov. 11, 2020.

(51) Int. Cl.
*A01D 67/00* (2006.01)
*A01D 34/64* (2006.01)
*A01D 34/81* (2006.01)
*A01D 101/00* (2006.01)

(52) U.S. Cl.
CPC ........... *A01D 67/005* (2013.01); *A01D 34/64* (2013.01); *A01D 34/81* (2013.01); *A01D 2101/00* (2013.01)

(58) Field of Classification Search
CPC ...... A01D 67/005; A01D 34/64; A01D 34/81; A01D 2101/00; A01D 34/661; A01D 34/68; A01D 34/82; A01B 59/006
See application file for complete search history.

(56) References Cited

U.S. PATENT DOCUMENTS

| 3,324,637 | A | * | 6/1967 | Windsor | A01D 41/16 56/2 |
|---|---|---|---|---|---|
| 3,874,150 | A | * | 4/1975 | Boeck | A01D 67/00 56/15.9 |
| 4,019,753 | A | * | 4/1977 | Kestel | A01B 59/062 280/416.2 |
| 4,737,067 | A | * | 4/1988 | Samejima | E02F 3/627 37/403 |
| 4,934,130 | A | | 6/1990 | Johansson | |

(Continued)

FOREIGN PATENT DOCUMENTS

| AU | 7504398 A * 1/1999 ........... A01D 34/662 |
|---|---|
| DE | 19503814 A1 * 10/1995 ........... A44C 5/2038 |

(Continued)

OTHER PUBLICATIONS

European Search Report Corresponding to Application No. 21205953 on Mar. 2, 2022 (2 pages).

(Continued)

*Primary Examiner* — Arpad Fabian-Kovacs
(74) *Attorney, Agent, or Firm* — Dority & Manning, P.A.

(57) ABSTRACT

A lawn mower including a frame; and mounting hardware configured to couple the frame to a detachable mower deck, wherein the mounting hardware includes: a quick release engagement interface; and a latched interface, the latched interface includes a self-closing latch and an engageable interface to permit selective opening of the self-closing latch.

19 Claims, 9 Drawing Sheets

(56) References Cited

U.S. PATENT DOCUMENTS

| | | | | |
|---|---|---|---|---|
| 5,025,617 A | * | 6/1991 | Kuhn | A01B 59/044 56/DIG. 9 |
| 5,528,889 A | * | 6/1996 | Kure | A01D 34/64 56/15.8 |
| 5,779,429 A | * | 7/1998 | Poole | E02F 3/3622 403/321 |
| 5,816,035 A | * | 10/1998 | Schick | A01D 34/74 56/15.8 |
| 5,865,016 A | | 2/1999 | Toman | |
| 5,956,932 A | * | 9/1999 | Schmidt | A01D 34/64 56/15.8 |
| 6,293,077 B1 | * | 9/2001 | Plas | F15B 13/01 56/17.1 |
| 6,341,480 B1 | | 1/2002 | Dahl | |
| 6,347,503 B1 | | 2/2002 | Esau et al. | |
| 6,470,660 B1 | * | 10/2002 | Buss | A01D 34/64 56/15.9 |
| 6,584,756 B2 | * | 7/2003 | Buss | A01D 34/64 56/15.8 |
| 6,837,032 B1 | * | 1/2005 | Swartzendruber | A01D 34/64 56/14.9 |
| 7,086,215 B2 | | 8/2006 | Hensley | |
| 7,293,398 B2 | | 11/2007 | Koehn | |
| 7,451,587 B2 | * | 11/2008 | Komiya | A01D 34/64 56/14.9 |
| 7,549,243 B1 | | 6/2009 | Gilles | |
| 7,596,936 B2 | * | 10/2009 | Schick | A01D 34/74 56/15.9 |
| 7,600,363 B2 | | 10/2009 | Porter | |
| 7,690,439 B2 | * | 4/2010 | Priepke | A01B 71/063 180/53.3 |
| 7,877,972 B2 | * | 2/2011 | Fox | A01D 34/64 56/15.6 |
| 7,905,297 B2 | * | 3/2011 | Fox | A01D 34/64 172/74 |
| 8,091,329 B2 | | 1/2012 | Schick | |
| 8,234,847 B2 | * | 8/2012 | Fox | A01D 34/64 56/15.6 |
| 9,693,501 B2 | * | 7/2017 | Giere | A01D 34/74 |
| 10,098,279 B2 | * | 10/2018 | Zheng | A01D 34/74 |
| 10,334,780 B2 | | 7/2019 | Bartel | |
| 10,470,364 B1 | | 11/2019 | Odom | |
| 10,716,258 B2 | | 7/2020 | Pellenc | |
| 10,827,664 B2 | * | 11/2020 | Simpson | A01D 34/662 |
| 11,212,952 B2 | * | 1/2022 | Martin | A01D 34/661 |
| 2002/0059788 A1 | * | 5/2002 | Velke | A01D 34/64 56/14.7 |
| 2004/0093840 A1 | * | 5/2004 | Velke | A01D 34/64 56/15.8 |
| 2006/0090442 A1 | * | 5/2006 | Komiya | A01D 34/64 56/14.7 |
| 2007/0056754 A1 | * | 3/2007 | Kollath | B60D 1/141 172/272 |
| 2007/0074496 A1 | * | 4/2007 | Sundberg | A01D 34/001 56/15.6 |
| 2007/0169951 A1 | * | 7/2007 | Clement | B60D 1/04 172/439 |
| 2008/0034723 A1 | | 2/2008 | Wright et al. | |
| 2008/0245044 A1 | * | 10/2008 | Shick | A01D 34/74 56/14.9 |
| 2008/0245045 A1 | * | 10/2008 | Schick | A01D 34/662 56/14.9 |
| 2008/0295477 A1 | * | 12/2008 | Porter | A01D 34/82 56/229 |
| 2009/0007739 A1 | | 1/2009 | Fujiwara | |
| 2009/0078437 A1 | * | 3/2009 | Fox | A01D 69/002 172/74 |
| 2009/0178381 A1 | * | 7/2009 | Gilles | E02F 3/627 56/15.2 |
| 2009/0182470 A1 | * | 7/2009 | Garvey | A01D 34/662 701/50 |
| 2009/0182471 A1 | * | 7/2009 | Bucher | A01D 75/28 701/50 |
| 2015/0181803 A1 | * | 7/2015 | Tada | A01D 34/661 56/320.1 |
| 2016/0050847 A1 | | 2/2016 | Bartel et al. | |
| 2017/0127613 A1 | | 5/2017 | Cracraft et al. | |
| 2019/0327887 A1 | | 10/2019 | Bengtzohn | |
| 2020/0068801 A1 | | 3/2020 | Bengtzohn | |
| 2020/0205338 A1 | | 7/2020 | Zeiler | |
| 2020/0267898 A1 | * | 8/2020 | Anderson | B66F 7/243 |
| 2020/0329624 A1 | * | 10/2020 | Thorsell | A01B 71/06 |
| 2021/0100165 A1 | * | 4/2021 | Decker | A01D 34/828 |

FOREIGN PATENT DOCUMENTS

| | | | | |
|---|---|---|---|---|
| EP | 1932411 A1 | * | 6/2008 | ......... A01B 59/006 |
| EP | 2825016 B1 | | 7/2018 | |
| EP | 3138377 B1 | | 8/2018 | |
| FR | 2889752 A1 | * | 2/2007 | ......... A01D 34/6812 |
| JP | 2008173052 A | | 7/2008 | |
| JP | 2011155859 A | | 8/2011 | |
| WO | WO2011092908 A1 | | 8/2011 | |
| WO | WO2019109982 A1 | | 6/2019 | |
| WO | WO2020053670 | | 3/2020 | |
| WO | WO2020053670 A1 | | 3/2020 | |

OTHER PUBLICATIONS

Chinese Office Action Corresponding with Application No. 202111330938.6 on Apr. 11, 2023 (1 page).

* cited by examiner

LAWN MOWERS, DETACHABLE MOWER DECKS, AND METHODS ASSOCIATED THEREWITH

CROSS-REFERENCE TO RELATED APPLICATIONS

The present application claims priority to U.S. Provisional Patent Application No. 63/112,465 filed on Nov. 11, 2020, the disclosure of which is incorporated by reference herein in its entirety.

FIELD

The present disclosure relates generally to mowers, and more particularly to mount systems for mower decks.

BACKGROUND

Riding lawn mowers generally include a deck mounted to and positioned below a frame. The deck may include one or more cutting blades at least partially surrounded by a shroud. The deck needs to periodically be installed onto and/or removed from the frame. However, this can be a very labor-intensive, complex, and time-consuming process. For example, known mowers utilize hardware and connection mechanisms which are difficult to install and uninstall in order to install and/or remove the deck from the frame.

Accordingly, improved methods and apparatus for installing and removing mower decks from associated frame are desired. In particular, methods and apparatus which are simple, reduce labor, and can be performed quickly would be advantageous.

BRIEF DESCRIPTION

Aspects and advantages of the invention in accordance with the present disclosure will be set forth in part in the following description, or may be obvious from the description, or may be learned through practice of the technology.

In accordance with one embodiment, a lawn mower is provided. The lawn mower includes a frame; and mounting hardware configured to couple the frame to a detachable mower deck, wherein the mounting hardware comprises: a quick release engagement interface; and a latched interface, the latched interface comprising a self-closing latch and an engageable interface to permit selective opening of the self-closing latch.

In accordance with another embodiment, a detachable mower deck for a lawn mower is provided. The detachable mower deck includes a quick release engagement interface; and a latched interface comprising a self-closing latch and an engageable interface to permit selective opening of the self-closing latch.

In accordance with another embodiment, a method for attaching a mower deck to a lawn mower frame is provided. The method includes aligning the mower deck and lawn mower frame together such that the mower deck is within a receiving area of the lawn mower frame; coupling the mower deck and lawn mower frame together through a quick release engagement interface; moving a first engagement mechanism coupled to the lawn mower frame such that a first mating interface of the first engagement mechanism is in position to mate with a first latched interface of the mower deck; and moving the first latched interface relative to the first mating interface so as to open a self-closing latch of the first latched interface, the self-closing latch being configured to automatically close after the first mating interface is coupled with the first latched interface.

These and other features, aspects and advantages of the present invention will become better understood with reference to the following description and appended claims. The accompanying drawings, which are incorporated in and constitute a part of this specification, illustrate embodiments of the technology and, together with the description, serve to explain the principles of the technology.

BRIEF DESCRIPTION OF THE DRAWINGS

A full and enabling disclosure of the present invention, including the best mode of making and using the present systems and methods, directed to one of ordinary skill in the art, is set forth in the specification, which makes reference to the appended figures, in which.

DETAILED DESCRIPTION

Figure 1:
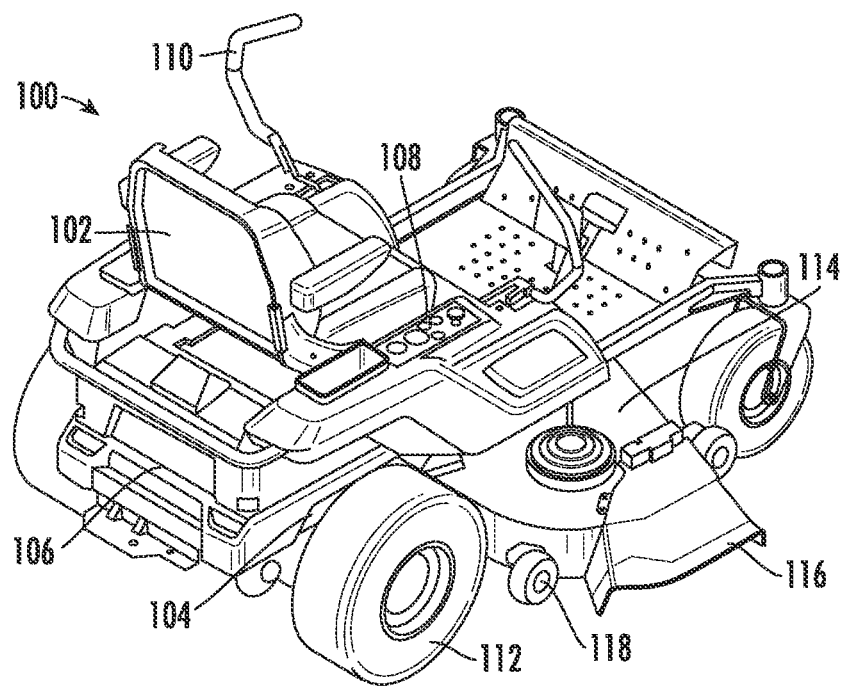
FIG. 1 is a top rear perspective view of a lawn mower in accordance with embodiments of the present disclosure.

Reference now will be made in detail to embodiments of the present invention, one or more examples of which are illustrated in the drawings. The word "exemplary" is used herein to mean "serving as an example, instance, or illustration." Any implementation described herein as "exemplary" is not necessarily to be construed as preferred or advantageous over other implementations. Moreover, each example is provided by way of explanation, rather than limitation of, the technology. In fact, it will be apparent to those skilled in the art that modifications and variations can be made in the present technology without departing from the scope or spirit of the claimed technology. For instance, features illustrated or described as part of one embodiment can be used with another embodiment to yield a still further embodiment. Thus, it is intended that the present disclosure covers such modifications and variations as come within the scope of the appended claims and their equivalents. The detailed description uses numerical and letter designations to refer to features in the drawings. Like or similar designations in the drawings and description have been used to refer to like or similar parts of the invention.

As used herein, the terms "first", "second", and "third" may be used interchangeably to distinguish one component from another and are not intended to signify location or importance of the individual components. The singular forms "a," "an," and "the" include plural references unless the context clearly dictates otherwise. The terms "coupled," "fixed," "attached to," and the like refer to both direct coupling, fixing, or attaching, as well as indirect coupling, fixing, or attaching through one or more intermediate components or features, unless otherwise specified herein. As used herein, the terms "comprises," "comprising," "includes" "including," "has," "having" or any other variation thereof, are intended to cover a non-exclusive inclusion. For example, a process, method, article, or apparatus that comprises a list of features is not necessarily limited only to those features but may include other features not expressly listed or inherent to such process, method, article, or apparatus. Further, unless expressly stated to the contrary, "or" refers to an inclusive-or and not to an exclusive-or. For example, a condition A or B is satisfied by any one of the following: A is true (or present) and B is false (or not present), A is false (or not present) and B is true (or present), and both A and B are true (or present).

Terms of approximation, such as "about," "generally," "approximately," or "substantially," include values within ten percent greater or less than the stated value. When used in the context of an angle or direction, such terms include within ten degrees greater or less than the stated angle or direction. For example, "generally vertical" includes directions within ten degrees of vertical in any direction, e.g., clockwise or counter-clockwise.

Benefits, other advantages, and solutions to problems are described below with regard to specific embodiments. However, the benefits, advantages, solutions to problems, and any feature(s) that may cause any benefit, advantage, or solution to occur or become more pronounced are not to be construed as a critical, required, or essential feature of any or all the claims.

In general, a lawn mower deck mount system in accordance with one or more embodiments described herein can include a latched interface configured to permit quick and easy replacement of the mower deck while simultaneously creating an interface between the lawn mower and mower deck with high structural integrity. The latched interface can be formed using elements of both the lawn mower and the mower deck. For example, the lawn mower may include an engagement mechanism defining a mating interface that can be selectively moved between a mower deck access position and an in-use position. In the mower deck access position the engagement mechanism can be selectively engaged with a self-closing latch of the mower deck. The mating interface and self-closing latch can be coupled together such that the self-closing latch automatically secures the mower deck to the lawn mower. An engageable interface can permit an operator to open the self-closing latch to detach the mower deck from the lawn mower. In accordance with one or more embodiments described herein, the latched interface can permit easier installation of the mower deck relative to the lawn mower. For instance, use of the latched interface can permit installation of the mower deck without the operator having to directly touch or engage any portion of the lawn mower. Moreover, for heavy mower decks, the operator can advantageously use both hands to lift the mower deck into engagement with the lawn mower. These and other advantages of the embodiments described herein will become apparent to those of ordinary skill in the art.

Referring now to the drawings, FIG. 1 illustrates a top rear perspective view of a lawn mower 100 in accordance with an exemplary embodiment. The lawn mower 100 is depicted as a riding lawn mower, including a seat 102 coupled to a frame 104. A motor 106 can power the lawn mower 100 and be controlled using switches 108 and/or controllers 110. The controllers 110 can include hand controllers, such as movable arms, foot controllers, or both. The motor 106 can be operatively coupled to one or more wheels 112 to propel the lawn mower 100 in a desired direction. In the depicted embodiment, the front wheels 112 are not driven by the motor 106 and at least one of the rear wheels 112 is driven by the motor 106. In other embodiments, the lawn mower 100 can include one or more driven front wheels 112 or a combination of one or more driven front wheels 112 and one or more driven back wheels 112. A mower deck 114 is positioned below the frame 104. The mower deck 114 can be operatively coupled to the motor 106 or a secondary motor (not shown) for driving a working implement, e.g., a rotating blade, of the mower deck 114. The mower deck 114 can include a chute 116 for expelling clippings and debris from the mower deck 114. The chute 116 can be integrally part of the mower deck 114 or include an attachment coupled to the mower deck 114. The mower deck 114 can further include one or more wheels 118 to permit movement of the mower deck 114 when not engaged with the frame 104 of the lawn mower 100, when the lawn mower 100 rides over certain obstacles that require the mower deck 114 to move relative to the lawn mower 100, or when the lawn mower 100 is operated with the mower deck 114 in its lowest height setting whereby the mower deck 114 travels along (or just above) the underlying ground surface.

In other embodiments, the lawn mower 100 can be a push mower, e.g., a walk behind lawn mower. In the illustrated embodiment, the lawn mower 100 is depicted as an electric lawn mower. The electric lawn mower can operate using an electric motor 106 coupled with one or more energy storage devices, e.g., batteries. The lawn mower 100 can alternatively be a gas-powered lawn mower. The gas-powered lawn mower can operate using a gas engine coupled with a fuel supply tank. Other implementations and designs are possible in accordance with various embodiments described herein.

Figure 2:
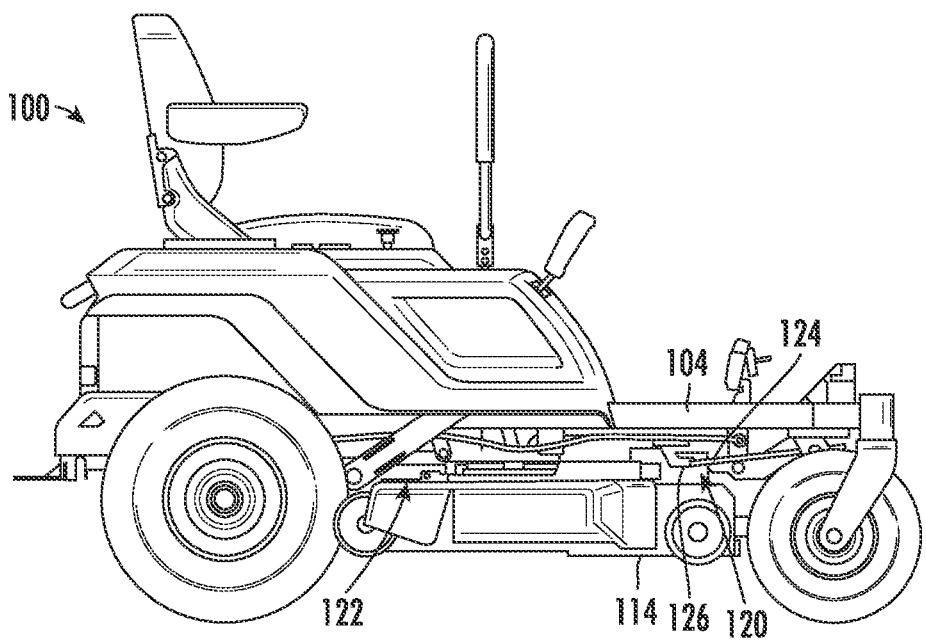
FIG. 2 is a side view of the lawn mower in accordance with embodiments of the present disclosure.

FIG. 2 illustrates a side view of the lawn mower 100 in accordance with an embodiment. The mower deck 114 is disposed at least partially, such as fully, below the frame 104 in an engaged position, i.e., ready for mowing. In an embodiment, the mower deck 114 can extend between the front and rear wheels 112 of the lawn mower 100. The mower deck 114 can be coupled to the frame 104 through a mower deck mount system including, e.g., one or more quick release interfaces 120 and one or more latched interfaces 122.

The quick release interface(s) 120 can be configured to rapidly attach the mower deck 114 and frame 104 together. By way of example, the quick release interface(s) 120 can each include a hook 124 coupled to the frame 104 and a hook receiving area 126 disposed on the mower deck 114. In another embodiment, the hook 124 can be part of the mower deck 114 and the hook receiving area 126 can be part of the frame 104. The hook 124 and hook receiving area 126 can be readily connectable with one another without a positive latch or other type of stopping element to prevent detachment therebetween. In certain instances, the hook 124 may be biased, e.g., spring loaded, so as to pull the hook receiving area 126, e.g., in a forward direction, to form a tight interface with the hook receiving area 126.

The latched interface(s) 122 can be spaced apart from the quick release interface(s) 120. In a particular embodiment, the latched interface(s) 122 can include two latched interfaces 122 and the quick release interface(s) 120 can include two quick release interfaces 120. The two quick release interfaces 120 can be disposed at a first position, e.g., at a front of the mower deck 114, and the two latched interfaces 122 can be disposed at a second position, e.g., at a rear of the mower deck 114, different from the first position. In an embodiment, the latched interface(s) 122 can be configured to maintain the quick release interface(s) 120 in a locked configuration. For instance, the latched interface(s) 122 can prevent the mower deck 114 from traveling a sufficient distance in a direction to unhook the hook 124 from the hook receiving area 126. In this regard, the latched interface(s) 122 may act as a lock for the quick release interface(s) 120.

Figure 3:
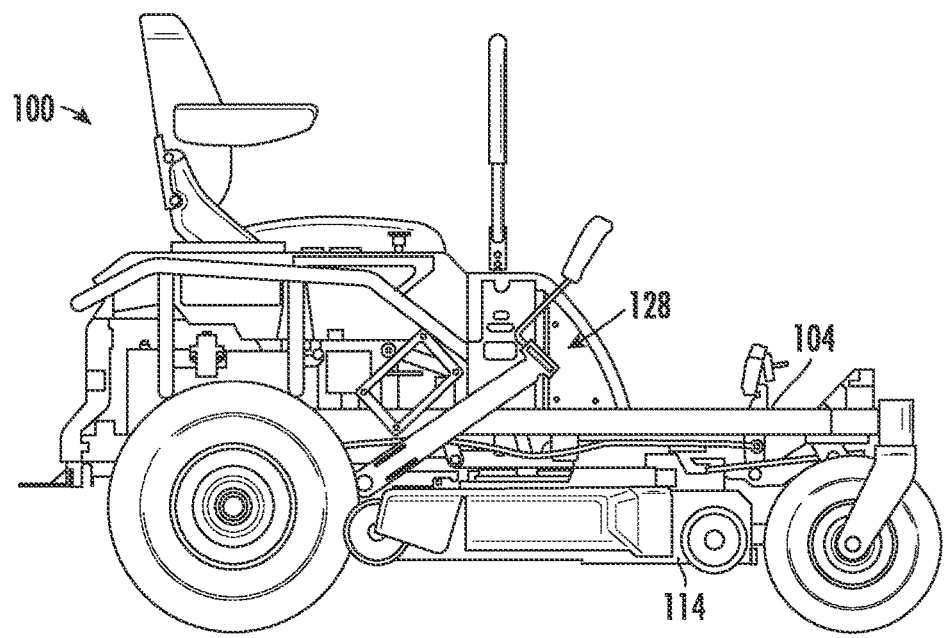
FIG. 3 is a partially cut away side view of the lawn mower in accordance with embodiments of the present disclosure.

FIG. 3 illustrates a partially cutaway side view of the lawn mower 100 in accordance with an embodiment. In the depicted embodiment, portions of an upper side fairing are removed. The lawn mower 100 may or may not include the upper side fairing or have a different fairing design from the design shown.

The lawn mower 100 can include an engagement mechanism 128 configurable between two or more positions. Each of the two or more position can correspond with a relative position of the mower deck 114 with respect to the frame 104. For example, the engagement mechanism 128 can include at least one mower deck access position, corresponding with one or more positions where an operator can access the mower deck 114 or a portion thereof, and at least one in-use position, corresponding with one or more positions in which the lawn mower 100 is ready for performing an activity, e.g., a mowing operation. The engagement mechanism 128 can be moveable between the at least one mower deck access position and the at least one in-use position. As the engagement mechanism 128 moves, the mower deck 114 can move accordingly.

Figure 4:
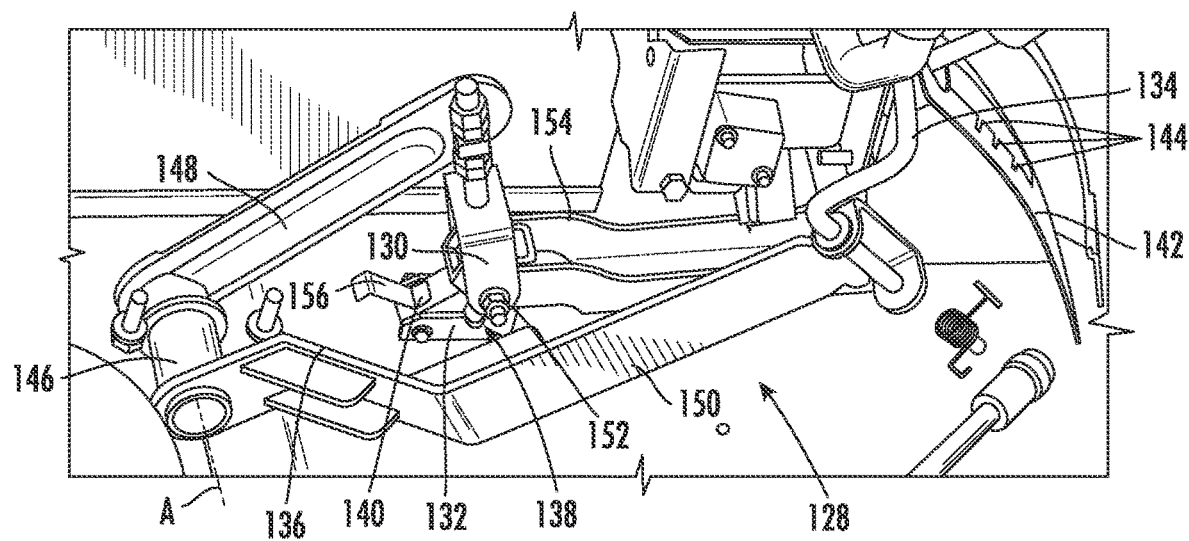
FIG. 4 is a close up view of an engagement mechanism of the lawn mower in accordance with embodiments of the present disclosure.

FIG. 4 illustrates a detailed view of an exemplary embodiment of the engagement mechanism 128. The engagement mechanism 128 includes a mating interface 130 configured to be selectively coupled with a support 132 of the mower deck 114 to form the latched interface 122. The engagement mechanism 128 further includes a handle 134 configured to be operated to control a relative position of the mating interface 130. The engagement mechanism 128 further includes a transmission element 136 configured to transmit movement from the handle 134 to the mating interface 130.

The latched interface 122 can be formed by the mating interface 130 of the engagement mechanism 128 and the support 132 of the mower deck 114. The mating interface 130 can be selectively retained by the support 132 to secure the mower deck 114 to the frame 104.

The support 132 can include a mating interface receiving area 138 configured to receive the mating interface 130, or a portion thereof, and a self-closing latch 140 configured to selectively prevent the mating interface 130 from exiting the mating interface receiving area 138. The self-closing latch 140 can be configured to move between an open configuration in which the mating interface receiving area 138 is accessible to the mating interface 130, and a closed configuration in which the mating interface receiving area 138 is closed. The self-closing latch 140 can be biased to the closed configuration. In certain instances, a spring can bias the self-closing latch 140 to the closed configuration. An exemplary spring includes a torsion spring. The self-closing latch 140 can remain in the closed configuration until acted upon by the mating interface 130 or an operator. The operator can open the self-closing latch 140 using an engagement mechanism 156 (described in greater detail below).

The handle 134 can be disposed along an area of the lawn mower 100 where the operator can access the handle 134 while operating the lawn mower 100 or while servicing the lawn mower 100. The handle 134 can be moveable between a plurality of different positions. The different positions can be defined, for example, by a multi-stop element 142 defining a plurality of stop positions 144. The operator can selectively move the handle 134 to the desired stop position 144 to position the mower deck 114 in a corresponding position. In an embodiment, at least one of the stop positions 144 can correspond with a mower deck access position and at least one of the stop positions 144 can correspond with an in-use position. In a particular embodiment, the handle 134 can be movable along a channel having a series of teeth for selectively receiving the handle 134. The operator may slide the handle 134 along the channel to adjust the height of the mower deck 114, and insert a portion of the handle 134 between the teeth to maintain the mower deck 114 at the selected height. As will be understood by a person of ordinary skill in the art, the height of the mower deck 114 can correspond to a cut depth of the grass (i.e., the cut length of the grass).

In a particular embodiment, the transmission 136 can include a rotatable element 146 configured to rotate about an axis A. The axis A can be fixed. For instance, the rotatable element 146 can be supported by one or more bearings or other rotatable interfaces. The transmission 136 can further include a first arm 148 extending between the rotatable element 146 and the mating interface 130, and a second arm 150 extending between the rotatable element 146 and the handle 134. In an embodiment, the first and second arms 148 and 150 can be rotationally offset from one another about the axis A. In another embodiment, the first and second arms 148 and 150 can be at a same relative rotational position with respect to the axis A.

Figure 9A:
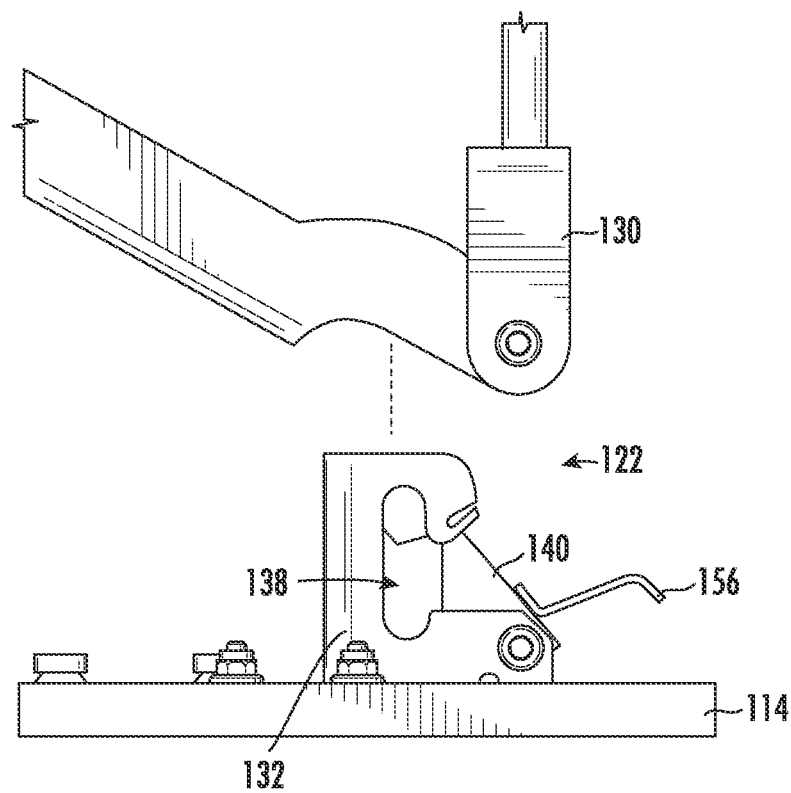
FIG. 9A is a side view of a latched interface between the mower deck and the frame of the lawn mower in accordance with embodiments of the present disclosure.
Figure 9B:
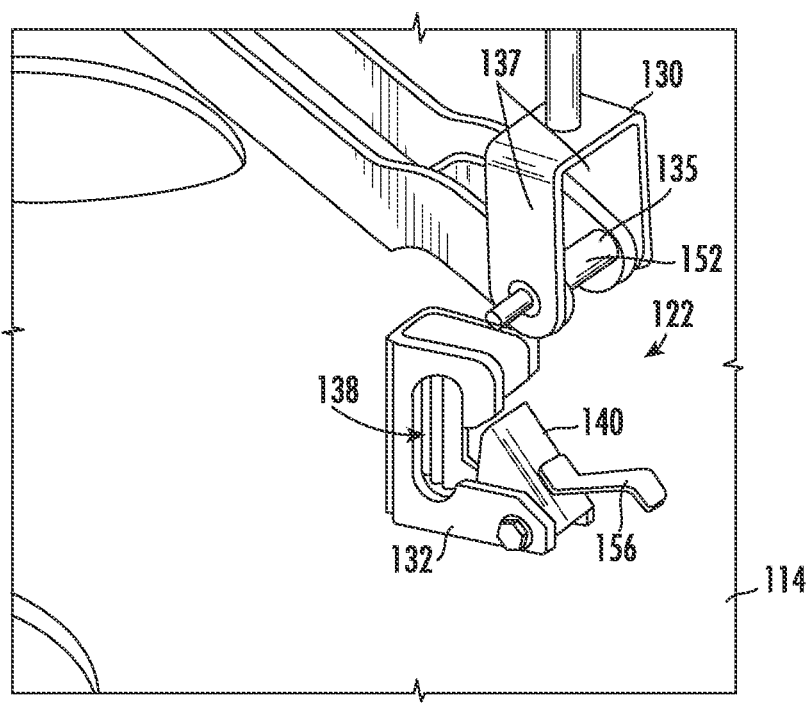
FIG. 9B is a perspective view of the latched interface between the mower deck and the frame of the lawn mower depicted in FIG. 9A in accordance with embodiments of the present disclosure.
Figure 10A:
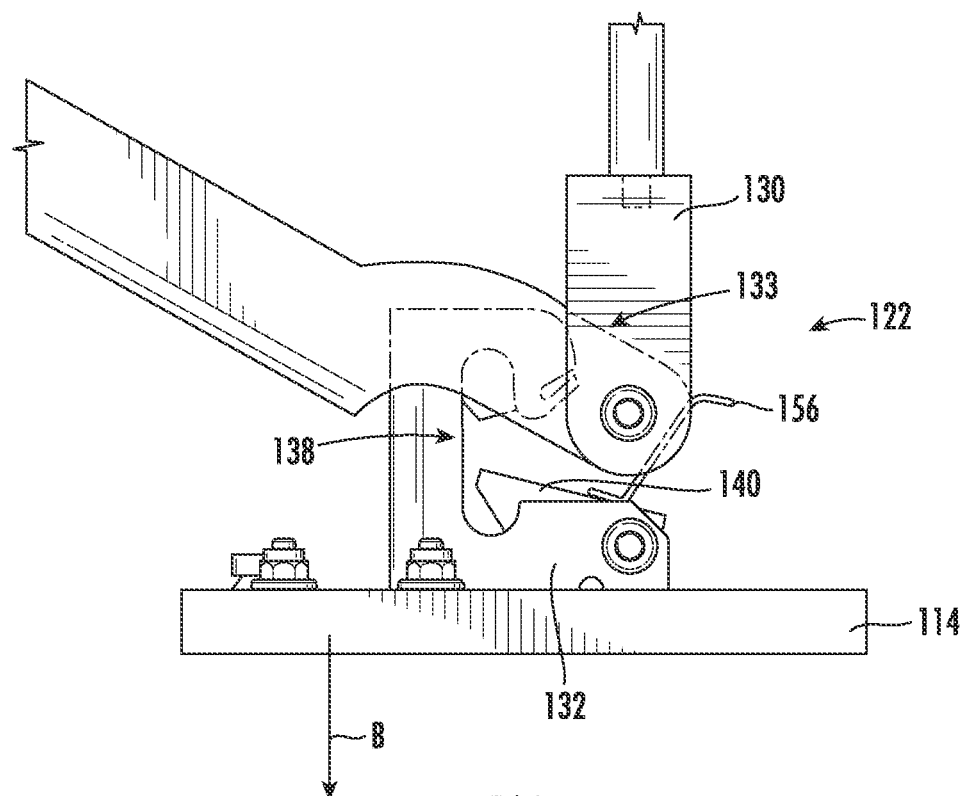
FIG. 10A is a side view of a latched interface between the mower deck and the frame of the lawn mower in accordance with embodiments of the present disclosure.
Figure 10B:
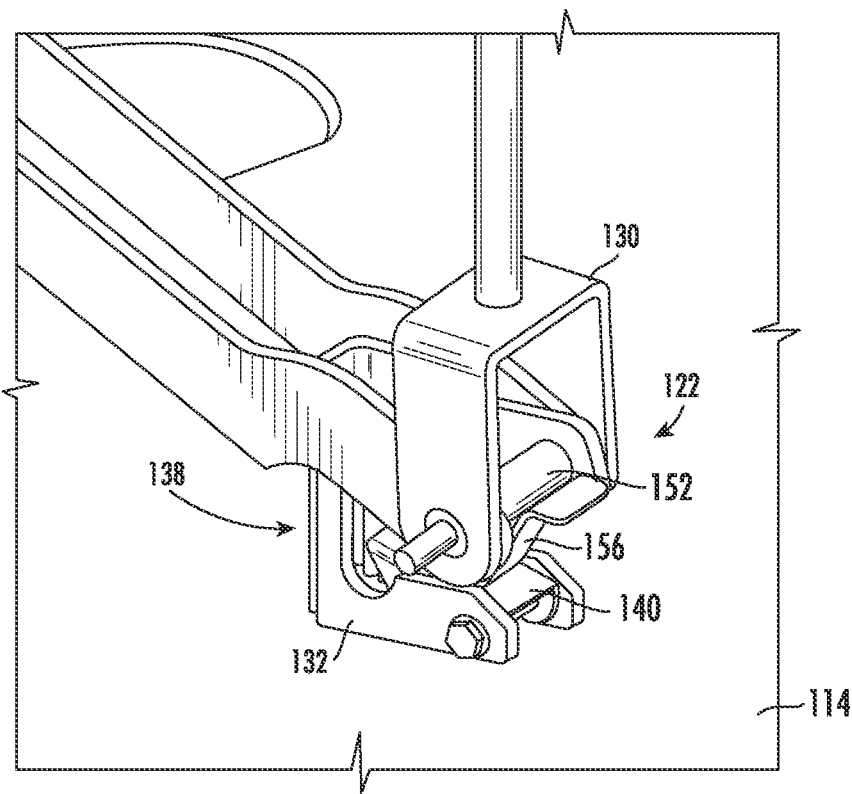
FIG. 10B is a perspective view of the latched interface between the mower deck and the frame of the lawn mower depicted in FIG. 10A in accordance with embodiments of the present disclosure.
Figure 11A:
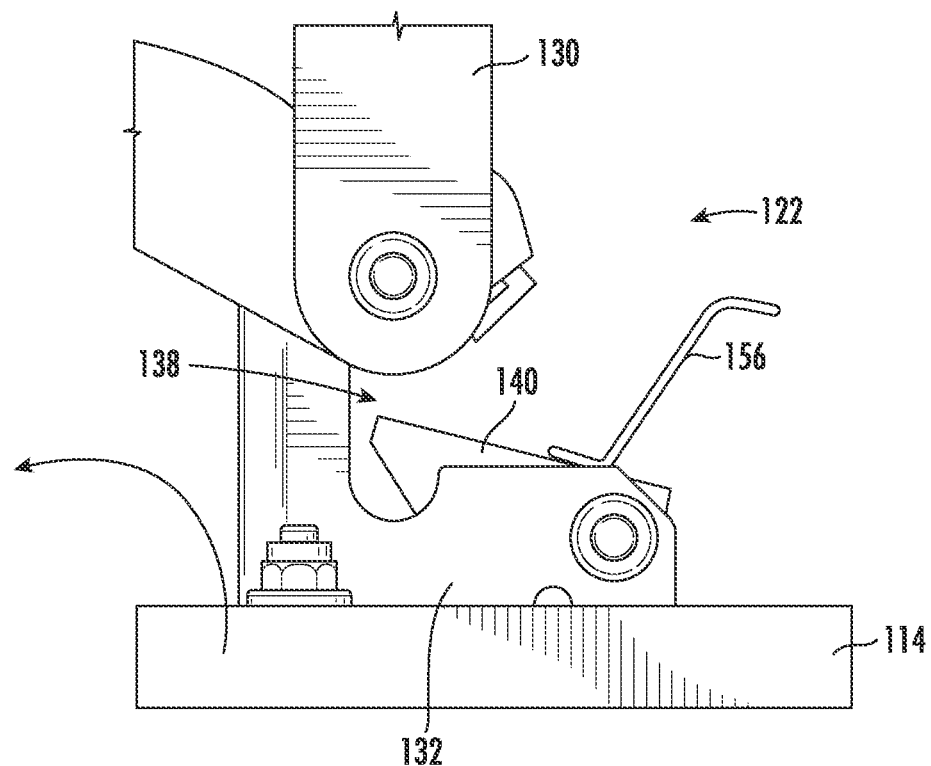
FIG. 11A is a side view of a latched interface between the mower deck and the frame of the lawn mower in accordance with embodiments of the present disclosure.
Figure 11B:
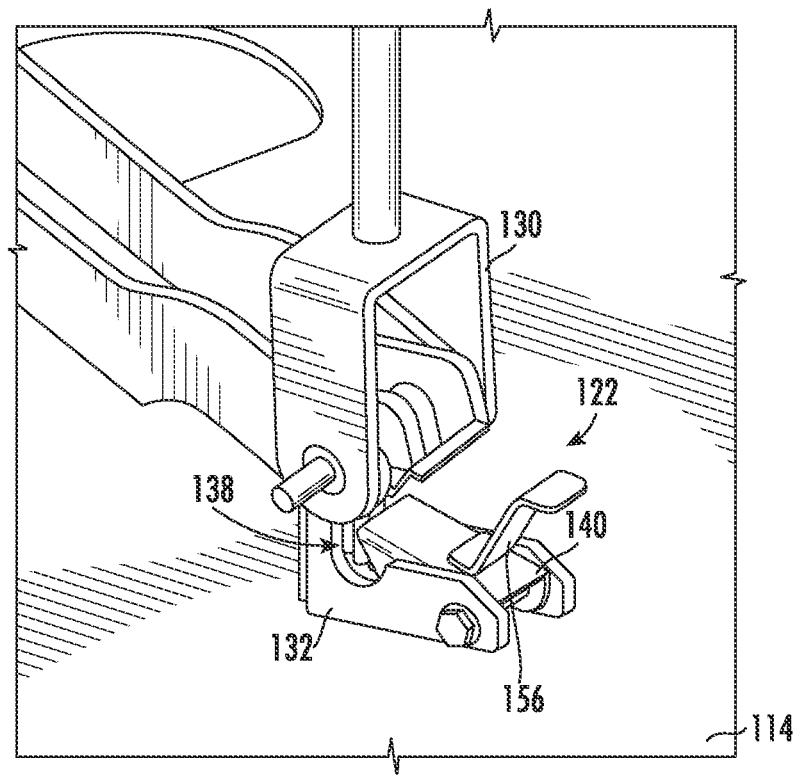
FIG. 11B is a perspective view of the latched interface between the mower deck and the frame of the lawn mower depicted in FIG. 11A in accordance with embodiments of the present disclosure.
Figure 12A:
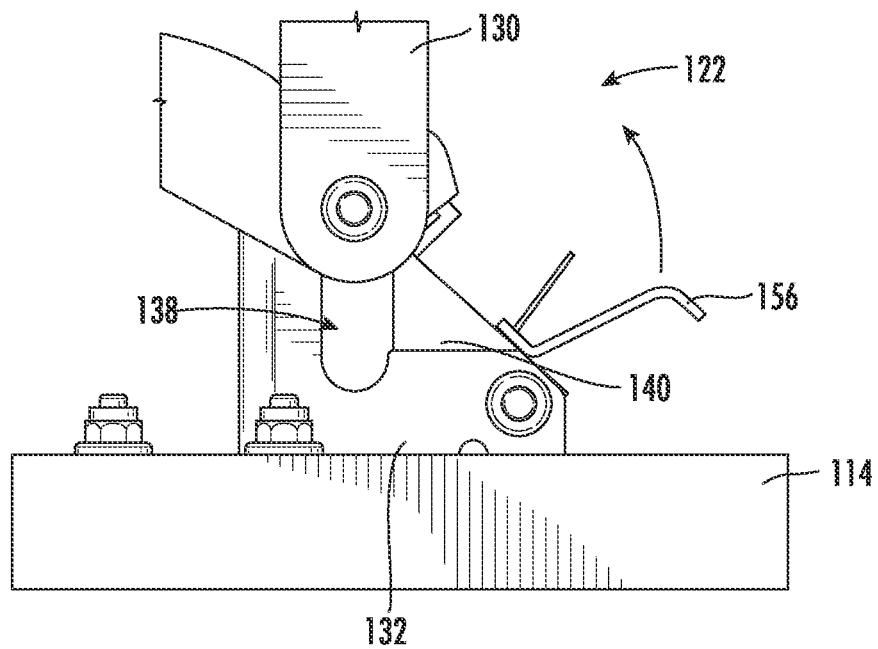
FIG. 12A is a side view of a latched interface between the mower deck and the frame of the lawn mower in accordance with embodiments of the present disclosure.
Figure 12B:
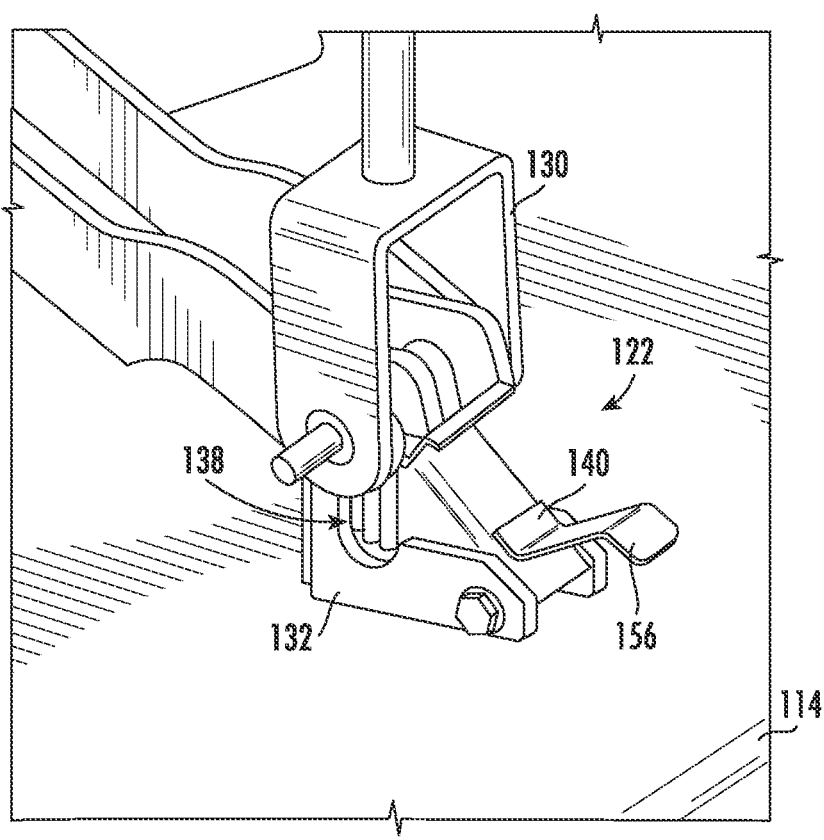
FIG. 12B is a perspective view of the latched interface between the mower deck and the frame of the lawn mower depicted in FIG. 12A in accordance with embodiments of the present disclosure.

As the handle 134 is moved, the second arm 150 can transmit rotational movement to the rotatable element 146 which can move the first arm 148 so as to move the mating interface 130. The mating interface 130 may be dynamically coupled to the first arm 148. For instance, the mating interface 130 may be pivotally coupled to the first arm 148. The mating interface 130 can include a complementary engagement interface 152 (FIG. 9B) that engages with the support 132. The complementary engagement interface 152 can include any attachment protocol that is complementary to the support 132 so as to permit attachment therebetween.

The engagement mechanism 128 can further include an additional attachment, such as a pivot bar 154 which connects at least one of the transmission 136 or mating interface 130 to the frame 104. In certain instances, the pivot bar 154 can cause the mating interface 130, and more particularly the complementary engagement interface 152, to track in a prescribed path, such as along an arc pathway. The arc pathway can be shaped, for example, by adjusting the relative dimensions of the pivot bar 154, mating interface 130, or first arm 148. A flatter arc pathway may result in less tension created at the quick release interface 120. A more rounded arc pathway may result in greater tension created at the quick release interface 120 as the latched interface 122 is biased a greater distance relative to the quick release interface 120.

Figure 5:
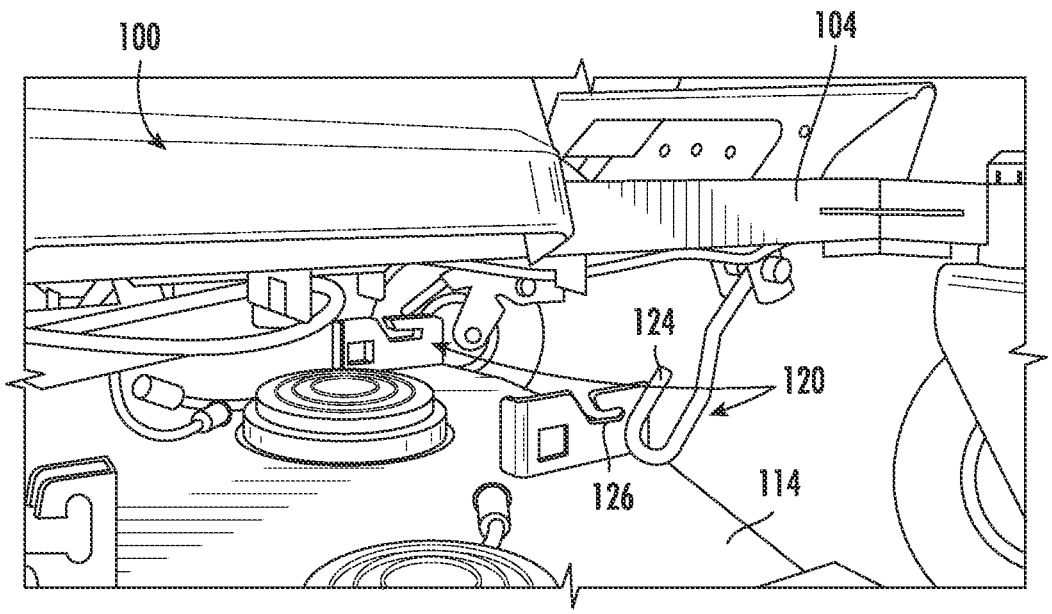
FIG. 5 is a side view of the lawnmower during a step of engaging a mower deck to a frame of the lawn mower in accordance with embodiments of the present disclosure.

FIGS. 5 through 8 illustrate steps of installing the mower deck 114 on the frame 104 of the lawn mower 100 in accordance with an exemplary embodiment of the present disclosure. FIG. 5 illustrates the mower deck 114 in the disengaged position, i.e., not coupled with the frame 104. This position may be encountered prior to attaching the mower deck 114 to the frame 104, during servicing operations when the mower deck 114 is removed from the frame 104, or the like.

To begin coupling of the mower deck 114 to the frame 104, the mower deck 114 is positioned below the frame 104 at an appropriate alignment location. The operator first attaches the mower deck 114 to the frame 104 using the quick release interfaces 120. In the illustrated embodiment, the lawn mower 100 includes two quick release interfaces 120, each positioned along a forward end of the mower deck 114. The operator can move the hook 124 of each quick release interface 120 into the corresponding hook receiving area 126 of the quick release interface 120. This can be repeated for each of the quick release interfaces 120. The mower deck 114 may be moved laterally after the hook 124 is positioned within the hook receiving area 126 so as to prevent detachment between the hook 124 and the hook receiving area 126. For instance, in the illustrated embodiment, the mower deck 114 may be moved rearward to secure the hook 124 within the hook receiving area 126.

Figure 6:
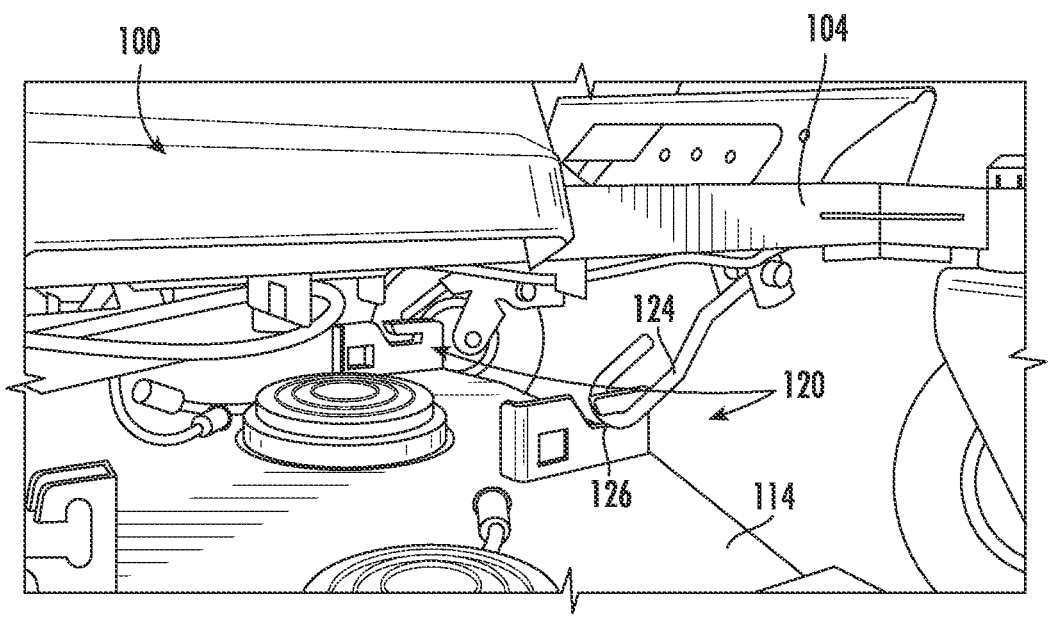
FIG. 6 is a side view of the lawnmower during another step of engaging the mower deck to the frame of the lawn mower in accordance with embodiments of the present disclosure.

FIG. 6 illustrates the hook 124 engaged with the hook receiving area 126 to complete one of the quick release interfaces 120. The hook 124 of the other quick release interface 120 has not yet been engaged with the hook receiving area 126 of the other quick release interface 120. Attachment of the other quick release interface 120 can be performed prior to coupling the latched interface(s) 122. In an embodiment, the other quick release interface 120 can have a same attachment protocol as the above described quick release interface 120. In certain instances, the quick release interfaces 120 are all mated prior to operating on the latched interface 122.

Figure 7:
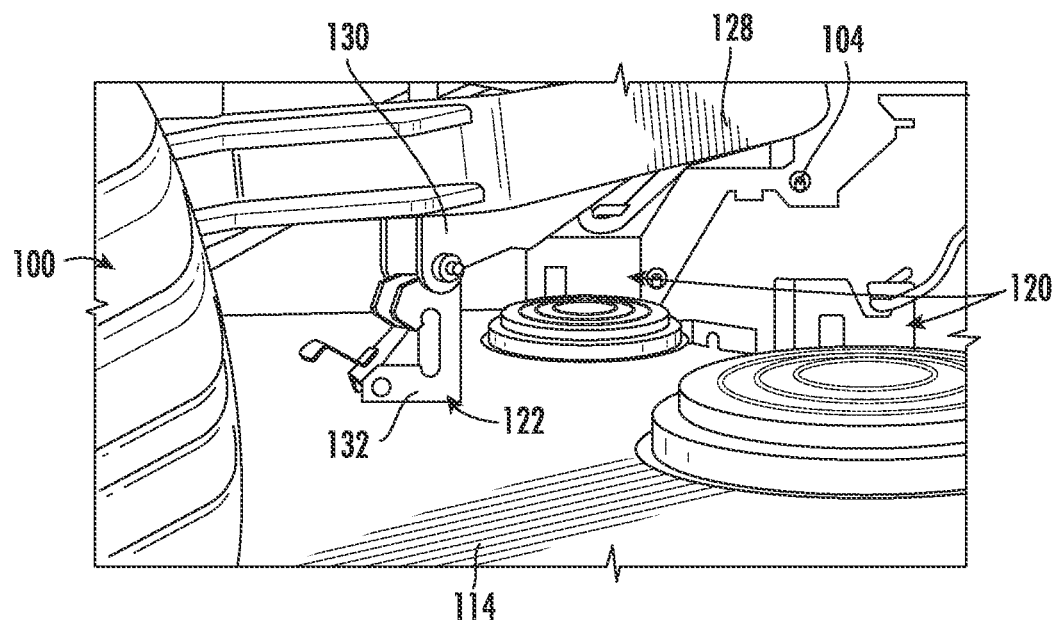
FIG. 7 is a side view of the lawnmower during a yet another step of engaging the mower deck to the frame of the lawn mower in accordance with embodiments of the present disclosure.

FIG. 7 illustrates a view of the latched interface 122 in the disengaged position. In the step depicted in FIG. 7, both of the quick release interfaces 120 are already engaged. If required, the mower deck 114 may be moved into alignment with the frame 104 such that the mating interface 130 of the engagement mechanism 128 and the support 132 of the mower deck 114 are aligned. In certain instances, this may include moving the mower deck 114, e.g., in a rearward direction, moving the frame 104, e.g., in a forward direction, or both.

The engagement mechanism 128 is depicted in FIG. 7 in one of the mower deck access positions where the engagement mechanism 128 is in position to be coupled with the support 132. To move the engagement mechanism 128 to the mower deck access position, the handle 134 can be reconfigured to an appropriate position, e.g., moved to an appropriate one of the stop positions 144, corresponding with the mower deck access position. Reconfiguring the handle 134 to the appropriate position can be performed before or after mating the quick release interfaces 120. In certain instances, the mower deck 114 may be resting on the underlying ground prior to attachment of the latched interface(s) 122.

Figure 8:
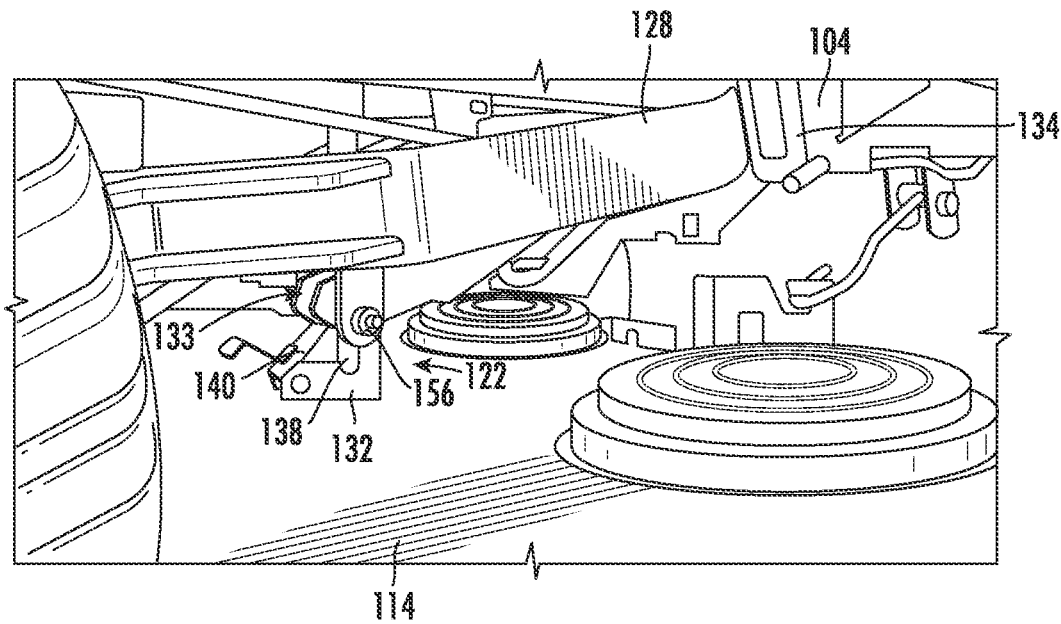
FIG. 8 is a side view of the lawnmower after engaging the mower deck to the frame of the lawn mower in accordance with embodiments of the present disclosure.

FIG. 8 illustrates the mower deck 114 engaged with the frame 104. To perform this step, the mower deck 114 can be raised to the frame 104 in a generally vertical direction. The support 132 may include one or more guide surfaces 133. The guide surfaces 133 may be configured to guide the mating interface 130 into correct position relative to the support 132 so as to allow passage of the engagement mechanism 156 into the mating interface receiving area 138 of the support 132. The self-closing latch 140 can be opened by the engagement mechanism 156, the operator, or both to permit passage of the engagement mechanism 156 into the mating interface receiving area 138. The self-closing latch 140 can return to the closed position after the engagement mechanism 156 is positioned within the mating interface receiving area 138. After the latched interface 122 is completed, the operator can adjust the position of the mower deck 114 using the engagement mechanism 128. In particular, the operator can reposition the handle 134 to an appropriate position, e.g., one of the stop positions 144 (FIG. 4) corresponding with one or more of the in-use positions. In such a manner, the operator can adjust the cutting height of the mower deck 114 using the same component used to move the mower deck 114 to the mower deck access position.

In certain instances, the lawn mower 100 can include two or more latched interfaces 122. In certain instances, the two or more latched interfaces 122 can share a common engagement mechanism 128. For instance, a second latched interface (not shown) can have a first arm coupled to the rotatable element 146. In such a manner, the handle 134 can be used to control the mating interfaces 130 of all of the latched interfaces 122 at a same time. In other instances, each of the latched interfaces 122 can use a separate engagement mechanism 128. In this regard, and by way of non-limiting example, the operator can selectively raise and lower each side of the mower deck 114 by selectively operating on one of the handles 134.

FIGS. 9A to 12B illustrate close up views of the latched interface 122 during the coupling process of joining the mating interface 130 and support 132 together as would be seen when moving the latched interface 122 between the uncoupled configuration (FIG. 7) and the coupled configuration (FIG. 8). The A-labeled figures (FIGS. 9A, 10A, 11A, and 12A) show a side view of the latched interface 122 while the B-labeled figures (FIGS. 9B, 10B, 11B, and 12B) show a top perspective view of the latched interface 122. Reference to any one of FIGS. 9A to 12B without the designation A or B is intended to refer to either or both of the A and B figures with the same number.

FIG. 9 shows the latched interface 122 in the detached, i.e., non-mated configuration. In this instance, the mower deck 114 is not coupled to the frame 104 through the support 132 and mating interface 130. This configuration may appear, for example, prior to coupling the frame 104 (FIG. 1) and mower deck 114 together or after uncoupling the mower deck 114 from the frame 104.

In a particular embodiment, the complementary engagement interface 152 of the mating interface 130 can include a pin 135 or other elongated member extending from a stanchion, such as between two stanchions 137. When preparing to couple the mower deck 114 relative to the frame 104, the pin 135 and support 132 can be brought into relative alignment with one another. For instance, the pin 135 can be positioned over the support 132. The pin 135 can lie along a longitudinal axis that is parallel, or generally parallel, with the rotational axis A of the self-closing latch 140.

The mating interface 130 and mower deck 114 can be brought together as illustrated in FIG. 10 by lowering the mating interface 130 in a direction along arrow B, raising the mower deck 114 in a direction generally opposite arrow B, or by performing both operations. In certain instances, the guide surface 133 of the support 132 can help guide the complementary engagement interface 152 towards the mating interface receiving area 138.

As the complementary engagement interface 152 contacts and is driven into the self-closing latch 140, the self-closing latch 140 may rotate to an open position, allowing the complementary engagement interface 152 to enter the mating interface receiving area 138. As illustrated, the self-closing latch 140 can include an engagement mechanism 156 configured to control a position of the self-closing latch 140. The complementary engagement interface 152, or another part of the mating interface 130, can interact with the engagement mechanism 156 while the mower deck 114 and frame 104 are moved together. In certain instances, the engagement mechanism 156 can act as a guide for the complementary engagement interface 152. In other instances, the engagement mechanism 156 can have no interaction with the complementary engagement interface 152 during the installation of the complementary engagement interface 152 within the support 132.

As the complementary engagement interface 152 is driven into the mating interface receiving area, the self-closing latch 140 can reach a relatively open most position after which it can begin closing upon further movement of the complementary engagement interface 152 into the mating interface receiving area 138. The self-closing latch 140 may be biased to the closed configuration by a biasing element, such as a spring.

FIG. 11 illustrates a position of the mating interface 130 after entering the mating interface receiving area 138 and clearing the self-closing latch 140. The self-closing latch 140 is shown in an open, or semi-open position. However, after the mating interface 130 clears the self-closing latch 140, the self-closing latch 140 can automatically return to the closed position. In this regard, the latched interface 122 can be automatically biased to the closed configuration. The self-closing latch 140 is depicted in an exaggerated open configuration to show clearance of the complementary engagement interface 152 into the mating interface receiving area 138. In practice, there may be no gap between the self-closing latch 140 and the complementary engagement interface 152 after the complementary engagement interface 152 clears the self-closing latch 140.

FIG. 12 illustrates the latched interface 122 after the self-closing latch 140 is returned to the closed position. The support 132 can act as a bracket to hold the mower deck 114 to the frame 104. With the self-closing latch 140 in the closed configuration, the latched interface 122 is secure and will not undesirably release the mower deck 114 from the frame 104. In this configuration, the lawn mower 100 is ready to engage in mowing operations.

Figure 13:
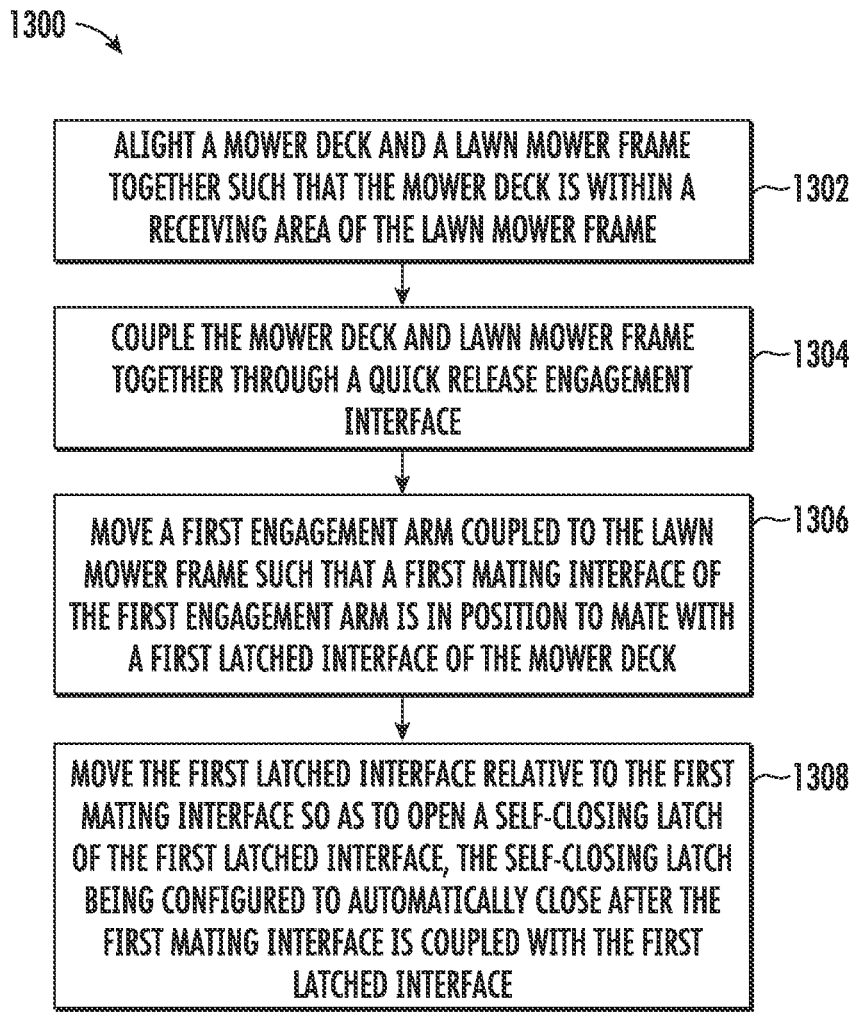
FIG. 13 is a flow chart illustrating a method of attaching a mower deck to a lawn mower frame in accordance with embodiments of the present disclosure.

FIG. 13 illustrates an exemplary method 1300 of attaching a mower deck to a lawn mower frame. The method 1300 includes a step 1302 of aligning a mower deck and lawn mower frame together such that the mower deck is within a receiving area of the lawn mower frame. The method 1300 includes a step 1304 of coupling the mower deck and lawn mower frame together through a quick release engagement interface. The method 1300 includes a step 1306 of moving a first engagement mechanism coupled to the lawn mower frame such that a first mating interface of the first engagement mechanism is in position to mate with a first latched interface of the mower deck. The method 1300 includes a step 1308 of moving the first latched interface relative to the first mating interface so as to open a self-closing latch of the first latched interface, the self-closing latch being configured to automatically close after the first mating interface is coupled with the first latched interface.

In a non-illustrated embodiment, the method 1300 can further include a step of moving the first engagement mechanism to a locked position after the first mating interface is mated with the first latched interface. The step of moving the first engagement mechanism to the locked position can be performed by moving a handle of the first engagement mechanism so as to pivot the first engagement mechanism about a pivot point. The step of moving the first latched interface relative to the first mating interface can include raising the mower deck above a prescribed elevation in the vertical direction and translating the mower deck in the horizontal direction. In an embodiment, opening of the self-closing latch can occur during translation in the horizontal direction.

In a non-illustrated embodiment, the method 1300 can further include a step of, after moving the first latched interface so as to dispose the first mating interface within the first latched interface, moving a second latched interface relative to a second mating interface of a second engagement mechanism so as to open a self-closing latch of the second latched interface. The self-closing latch of the second latched interface can be configured to automatically close after the second mating interface is disposed within the second latched interface.

Lawn mower mount systems in accordance with embodiments described herein are simple, reduce labor, and can be performed quickly, and result in the mower deck being securely mounted to the frame of the lawn mower. Certain embodiments described herein allow the operator to easily attach the mower deck and frame together while reducing the number of dirty or greasy parts the operator must handle. Use of a common handle disposed in a clean area of the lawn mower for moving the mower deck between a plurality of use and at least one access position can result in a cleaner operation in accordance with one or more embodiments described herein.

Further aspects of the invention are provided by one or more of the following embodiments:

Embodiment 1. A lawn mower comprising: a frame; and mounting hardware configured to couple the frame to a detachable mower deck, wherein the mounting hardware comprises: a quick release engagement interface; and a latched interface, the latched interface comprising a self-closing latch and an engageable interface to permit selective opening of the self-closing latch.

Embodiment 2. The lawn mower of claim 1, further comprising an engagement mechanism coupled to the frame, wherein the engagement mechanism is configurable between a mower deck access position, whereby configuring the engagement mechanism at the mower deck access position causes the mower deck to be disposed at a position where an operator can selectively open the self-closing latch, and at least one in-use position, whereby configuring the engagement mechanism at one or more of the in-use positions readies the mower deck for performing mowing operations.

Embodiment 3. The lawn mower of claim 2, wherein the engagement mechanism comprises: a mating interface configured to interact with the self-closing latch and support the detachable mower deck in the at least one in-use positions; a handle configured to be operated on to control a relative position of the mating interface; and a transmission element configured to transmit movement of the handle to the mating interface.

Embodiment 4. The lawn mower of claim 3, wherein the transmission element comprises a rotatable element, a first arm extending between the rotatable element and the mating interface, and a second arm extending between the rotatable element and the handle, and wherein moving the handle causes the mating interface to move.

Embodiment 5. The lawn mower of claim 2, wherein the self-closing latch is configured to move between a locked state and an unlocked state, wherein the self-closing latch is configured to be unlocked by actuation of the engageable interface or upon being pivotally moved by a mating interface of the lawn mower in a direction into the latched interface.

Embodiment 6. The lawn mower of claim 5, wherein the latched interface comprises a receiving area having an opening, wherein the self-closing latch is selectively disposed in the opening of the receiving area, and wherein the self-closing latch is configured to pivot about a pivot axis adjacent to the opening between the locked and unlocked states.

Embodiment 7. The lawn mower of claim 1, wherein the at least one quick release engagement interface comprises a hook coupled to the frame and a hook receiving area disposed on the detachable mower deck.

Embodiment 8. The lawn mower of claim 1, wherein the latched interface comprises a first latched interface and a second latched interface, the first and second latched interfaces being spaced apart from one another on the mower deck, and wherein the first and second latched interfaces each comprise a self-closing latch and an engageable interface.

Embodiment 9. A detachable mower deck for a lawn mower, the detachable mower deck comprising: a quick release engagement interface; and a latched interface comprising a self-closing latch and an engageable interface to permit selective opening of the self-closing latch.

Embodiment 10. The detachable mower deck of claim 9, wherein the latched interface is configured to be coupled with a mating interface of an engagement mechanism of the lawn mower, and wherein the engagement mechanism is configurable between a mower deck access position, whereby the mower deck is disposed at a position where an operator can selectively open the self-closing latch, and at least one in-use position, whereby the mower deck can be utilized by the lawn mower for performing mowing operations.

Embodiment 11. The detachable mower deck of claim 10, wherein the engagement mechanism comprises: a mating interface configured to interact with the self-closing latch and support the detachable mower in the in-use position; and a handle configured to be operated by a user to control a relative position of the mating interface, wherein the handle is disposed at a vertical elevation above the mating interface, and wherein an angular offset between the engagement mechanism and a horizontal plane increases as the engagement mechanism is reconfigured from the at least one in-use position to the mower deck access position.

Embodiment 12. The detachable mower deck of claim 9, wherein the self-closing latch is configured to pivot about a pivot axis between a locked state and an unlocked state, wherein the self-closing latch is configured to be unlocked by actuation of the engageable interface or upon being pivotally moved by a mating interface of the lawn mower in a direction into the latched interface.

Embodiment 13. The detachable mower deck of claim 9, wherein the self-closing latch comprises a ramped entry.

Embodiment 14. The detachable mower deck of claim 9, wherein the latched interface comprises a first latched interface and a second latched interface, the first and second latched interfaces being spaced apart from one another on the detachable mower deck, and wherein the first and second latched interfaces each comprise a self-closing latch and a engageable interface.

Embodiment 15. The lawn mower of claim 9, wherein the at least one quick release engagement interface comprises a hook coupled to the frame and a hook receiving area disposed on the detachable mower deck.

Embodiment 16. A method of attaching a mower deck to a lawn mower frame, the method comprising: aligning the mower deck and lawn mower frame together such that the mower deck is within a receiving area of the lawn mower frame; coupling the mower deck and lawn mower frame together through a quick release engagement interface; moving a first engagement mechanism coupled to the lawn mower frame such that a first mating interface of the first engagement mechanism is in position to mate with a first latched interface of the mower deck; and moving the first latched interface relative to the first mating interface so as to open a self-closing latch of the first latched interface, the self-closing latch being configured to automatically close after the first mating interface is coupled with the first latched interface.

Embodiment 17. The method of claim 16, further comprising moving the first engagement mechanism to a locked position after the first mating interface is mated with the first latched interface.

Embodiment 18. The method of claim 17, wherein moving the first engagement mechanism to the locked position is performed by moving a handle of the first engagement mechanism so as to pivot the first engagement mechanism about a pivot point.

Embodiment 19. The method of claim 16, wherein moving the first latched interface relative to the first mating interface comprises raising the mower deck above a prescribed elevation in the vertical direction and translating the mower deck in the horizontal direction, and wherein opening of the self-closing latch occurs during translation in the horizontal direction.

Embodiment 20. The method of claim 16, wherein the method further comprises: after moving the first latched interface so as to dispose the first mating interface within the first latched interface, moving a second latched interface relative to a second mating interface of a second engagement mechanism so as to open a self-closing latch of the second latched interface, the self-closing latch of the second latched interface being configured to automatically close after the second mating interface is disposed within the second latched interface.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal language of the claims.

What is claimed is:

1. A lawn mower comprising:
   a frame;
   a mower deck; and
   mounting hardware configured to detachably couple the frame to the mower deck, wherein the mounting hardware comprises:
     a quick release engagement interface; and
     a latched interface comprising:
       a mating interface coupled to the frame;
       a support coupled to the mower deck, the support defining a receiving area configured to receive the mating interface;
       a self-closing latch movable relative to the support between an open configuration and a closed configuration to selectively restrict access of the mating interface to and from the receiving area; and
       an engagement mechanism coupled to the self-closing latch, the engagement mechanism actuatable to move the self-closing latch from the closed configuration to the open configuration;
     wherein the mating interface is disposed in the receiving area of the support when the frame is coupled to the mower deck,
     wherein the mating interface remains disposed within the receiving area of the support after the self-closing latch is moved to the open configuration until the mower deck is raised in a vertical direction relative to the support, and
     wherein a size of the receiving area is reduced when the self-closing latch is in the open configuration.

2. The lawn mower of claim 1, further comprising an engagement mechanism coupled to the frame, wherein the engagement mechanism is configurable between a mower deck access position, whereby configuring the engagement mechanism at the mower deck access position causes the mower deck to be disposed at a position where an operator can selectively open the self-closing latch, and at least one in-use position, whereby configuring the engagement mechanism at one or more of the in-use positions readies the mower deck for performing mowing operations.

3. The lawn mower of claim 2, wherein the engagement mechanism comprises:
   the mating interface configured to interact with the self-closing latch and support the detachable mower deck in the at least one in-use positions;
   a handle configured to be operated on to control a relative position of the mating interface; and
   a transmission element configured to transmit movement of the handle to the mating interface.

4. The lawn mower of claim 3, wherein the transmission element comprises a rotatable element, a first arm extending between the rotatable element and the mating interface, and a second arm extending between the rotatable element and the handle, and wherein moving the handle causes the mating interface to move.

5. The lawn mower of claim 1, wherein the receiving area defines a space in which the mating interface is disposed when the frame is coupled to the mower deck, and wherein the space of the receiving area is elongated in a direction oriented perpendicular to a rotational axis of the self-closing latch.

6. The lawn mower of claim 1, wherein the self-closing latch is configured to pivot about a pivot axis disposed adjacent to an opening of the receiving area between the locked and unlocked configurations.

7. The lawn mower of claim 1, wherein the mating interface comprises a pin that extends through the receiving area when the frame is coupled to the mower deck, and wherein the pin is disposed between two stanchions, the two stanchions coupled to the frame.

8. The lawn mower of claim 1, wherein the latched interface comprises a first latched interface and a second latched interface, the first and second latched interfaces being spaced apart from one another on the mower deck.

9. A detachable mower deck for a lawn mower, the detachable mower deck comprising:
   a quick release engagement interface; and
   a latched interface comprising:
     a support coupled to the mower deck, the support defining a receiving area configured to receive a mating interface coupled to the frame of the lawn mower;
     a self-closing latch movable relative to the support between an open configuration and a closed configuration to selectively restrict access of the mating interface into and out of the receiving area; and
     an engagement mechanism coupled to the self-closing latch, the engagement mechanism actuatable to move the self-closing latch from the closed configuration to the open configuration,
     wherein the receiving area defines a space that is elongated in a direction oriented perpendicular to a rotational axis of the self-closing latch, and
     wherein a size of the receiving area is reduced when the self-closing latch is in the open configuration.

10. The detachable mower deck of claim 9, wherein the latched interface is configured to be coupled with a mating interface of an engagement mechanism of the lawn mower, and wherein the engagement mechanism is configurable between a mower deck access position, whereby the mower deck is disposed at a position where an operator can selectively open the self-closing latch, and at least one in-use position, whereby the mower deck can be utilized by the lawn mower for performing mowing operations.

11. The detachable mower deck of claim 9, wherein the self-closing latch is configured to pivot about a pivot axis between an open configuration and a closed configuration, wherein the self-closing latch is configured to be unlocked by actuation of the engageable interface or upon being pivotally moved by a mating interface of the lawn mower in a direction into the latched interface.

12. The detachable mower deck of claim 9, wherein the self-closing latch comprises a ramped entry.

13. The detachable mower deck of claim 9, wherein the latched interface comprises a first latched interface and a second latched interface, the first and second latched interfaces being spaced apart from one another on the detachable mower deck.

14. The lawn mower of claim 9, wherein the at least one quick release engagement interface comprises a hook coupled to the frame and a hook receiving area disposed on the detachable mower deck.

15. The detachable mower deck of claim 14, wherein the quick release engagement interface is configured to form a tight interface with the hook when the hook is biased in a forward direction.

16. A method of detaching a mower deck from a lawn mower frame, the method comprising:

moving a self-closing latch from a closed configuration to an open configuration, wherein in the closed configuration a mating interface coupled to a frame of the lawn mower is captured and retained in a receiving area defined by the mower deck, wherein a size of the receiving area is reduced when the self-closing latch is in the open configuration, and wherein in the open configuration the mating interface is removable from the receiving area;

with the self-closing latch in the open configuration, raising the mower deck in a vertical direction until the mating interface is removable from the receiving area in a lateral direction, the lateral direction being perpendicular to the vertical direction;

translating the mower deck relative to the frame in the lateral direction until the mating interface is clear of the receiving area; and releasing the self-locking latch from the open configuration, the self-closing latch being spring biased to the closed configuration.

17. The method of claim 16, wherein the receiving area prevents the mating interface from exiting the receiving area after the self-closing latch is moved to the open configuration until the mower deck is raised in the vertical direction.

18. The method of claim 16, wherein the self-closing latch is configured to pivot about a pivot axis between the locked configuration and the unlocked configuration.

19. The method of claim 16, wherein translating the mower deck relative to the frame is performed by translating the mower deck in a forward direction.

* * * * *